(12) United States Patent
Van Wingerden (10) Patent No.: US 10,080,335 B1
(45) Date of Patent: Sep. 25, 2018

(54) APPARATUS, SYSTEM AND METHOD FOR A GROW RING FOR PRODUCE

(71) Applicant: Johannes Cornelious Van Wingerden, Stevensburg, VA (US)

(72) Inventor: Johannes Cornelious Van Wingerden, Stevensburg, VA (US)

(*) Notice: Subject to any disclaimer, the term of this patent is extended or adjusted under 35 U.S.C. 154(b) by 0 days.

(21) Appl. No.: 15/723,032

(22) Filed: Oct. 2, 2017

(51) Int. Cl.
| | |
|---|---|
| *A01G 31/02* | (2006.01) |
| *A01G 9/02* | (2018.01) |
| *A47F 7/00* | (2006.01) |

(52) U.S. Cl.
CPC .............. *A01G 31/02* (2013.01); *A01G 9/027* (2013.01); *A01G 9/028* (2013.01); *A47F 7/0078* (2013.01)

(58) Field of Classification Search
CPC ...... A01G 31/02; A01G 31/06; A01G 9/1026; A01G 9/10; A01G 9/02; A01G 2009/003; A01G 9/024; A01G 9/027; A01G 9/042; A01G 9/104; A01G 9/028; A47F 7/0078; B65D 25/24; B65D 25/22; B65D 21/0204; B65D 21/0202; B65D 21/0201; B65D 21/0233; B65D 21/02
See application file for complete search history.

(56) References Cited

U.S. PATENT DOCUMENTS

| | | |
|---|---|---|
| D24,929 S | 11/1895 | Nichols |
| D32,585 S | 4/1900 | Pessano |
| 1,601,259 A | 9/1926 | Pettigrew |
| 1,690,910 A | 11/1928 | Shapiro |
| 1,778,150 A * | 10/1930 | Freeburg ............ A01G 9/02 47/71 |
| D82,957 S | 12/1930 | Rachlin |
| D102,968 S | 1/1937 | Farber |
| 2,090,325 A | 8/1937 | Deubel |
| 2,164,060 A | 6/1939 | Gerner |
| 2,205,303 A * | 6/1940 | Munsell ............ A01G 31/02 47/63 |
| 2,231,749 A | 2/1941 | Damerell |
| RE21,820 E * | 6/1941 | Munsell ............ A01G 31/02 47/63 |
| 2,276,376 A | 3/1942 | Deubel |
| 2,312,582 A | 3/1943 | Patrick |
| 2,548,910 A | 4/1951 | Rylander |
| 2,639,549 A | 5/1953 | Wubben et al. |
| 2,747,331 A | 5/1956 | Steiner |
| 2,770,957 A | 11/1956 | Bronson |
| 2,791,273 A | 5/1957 | Brownell |

(Continued)

FOREIGN PATENT DOCUMENTS

| | | |
|---|---|---|
| DE | 4020116101516-0001 | 4/2017 |
| EP | 1407987 A1 | 4/2004 |

(Continued)

OTHER PUBLICATIONS

English-language translation of WO 2014/199917 A1 (Year: 2014).
(Continued)

*Primary Examiner* — Kathleen Iwasaki Alker
(74) *Attorney, Agent, or Firm* — Ali Sharifzadeh (57) ABSTRACT

A device, system, and method are provided for growing, transporting, displaying, and storing produce. The grow ring device may allow produce to grow in a hydroponic growth apparatus. It may then secure the produce in a bowl. The bowl may have an attachable base that can supply water to the produce.

11 Claims, 7 Drawing Sheets

(56) References Cited

U.S. PATENT DOCUMENTS

| | | | |
|---|---|---|---|
| D187,184 S | 2/1960 | Tangney | |
| 3,199,250 A * | 8/1965 | Sawyer | A01G 31/02 47/63 |
| 3,288,340 A | 11/1966 | Shapiro et al. | |
| 3,300,895 A | 1/1967 | Dosedla et al. | |
| D217,247 S | 4/1970 | Brown | |
| 3,581,880 A | 6/1971 | Iversen | |
| 3,650,521 A | 3/1972 | Meli | |
| 3,717,953 A | 2/1973 | Kuhn et al. | |
| 3,766,684 A | 10/1973 | Kato | |
| 3,826,349 A | 7/1974 | Stevenson | |
| 3,850,287 A | 11/1974 | Petro | |
| 3,879,889 A * | 4/1975 | Schmid | A01G 9/02 47/60 |
| 3,911,632 A | 10/1975 | Bryfogle et al. | |
| 3,913,758 A | 10/1975 | Faircloth et al. | |
| 3,965,616 A | 6/1976 | Ridgeway | |
| 3,975,860 A * | 8/1976 | Harned | A01G 9/02 47/81 |
| 3,973,353 A | 10/1976 | Dedolph | |
| 4,006,557 A | 2/1977 | Sawyer | |
| 4,028,847 A | 6/1977 | Davis et al. | |
| 4,035,950 A | 7/1977 | Anselm | |
| 4,044,886 A | 8/1977 | Sender | |
| 4,048,754 A | 9/1977 | Laux | |
| 4,057,931 A | 11/1977 | Stutelberg et al. | |
| 4,118,891 A | 10/1978 | Kehl et al. | |
| 4,145,841 A * | 3/1979 | Woolpert | A01G 9/02 47/66.1 |
| 4,160,342 A * | 7/1979 | Dryer | A01G 27/04 47/80 |
| 4,179,846 A * | 12/1979 | Carlisle | A01G 31/02 47/59 R |
| 4,198,784 A * | 4/1980 | Sukert | A01G 27/04 47/79 |
| 4,216,618 A | 8/1980 | Davis et al. | |
| 4,236,353 A * | 12/1980 | Sorenson | A01G 27/04 47/39 |
| 4,279,101 A | 7/1981 | Leroux | |
| 4,312,152 A | 1/1982 | Drury et al. | |
| 4,315,382 A | 2/1982 | Kay et al. | |
| D263,291 S | 3/1982 | Paton | |
| 4,324,069 A | 4/1982 | Flagg | |
| 4,407,092 A | 10/1983 | Ware | |
| 4,476,651 A | 10/1984 | Drury | |
| 4,557,070 A * | 12/1985 | Oyama | A01G 27/04 47/80 |
| 4,578,898 A | 4/1986 | Greenbaum | |
| 4,604,837 A | 8/1986 | Beam | |
| 4,715,144 A * | 12/1987 | Lee | A01G 9/021 47/66.6 |
| 4,837,973 A | 6/1989 | Snekkenes | |
| D311,589 S | 10/1990 | Benchimol et al. | |
| 4,978,023 A * | 12/1990 | Behlrnann | A47J 41/00 206/501 |
| 4,989,365 A | 2/1991 | Roger | |
| 5,010,686 A | 4/1991 | Rivest | |
| 5,048,434 A | 9/1991 | Forster et al. | |
| 5,117,581 A | 6/1992 | Green et al. | |
| 5,125,184 A * | 6/1992 | Anderson | A01G 27/06 47/73 |
| 5,131,185 A | 7/1992 | Van Wingerden | |
| 5,168,664 A * | 12/1992 | Deutschmann, Sr. | A01G 27/008 47/59 R |
| 5,201,141 A | 4/1993 | Ahm | |
| 5,225,342 A * | 7/1993 | Farrell | A01G 5/06 435/430 |
| 5,282,335 A | 2/1994 | Holtkamp, Jr. | |
| 5,323,567 A | 6/1994 | Nakayama et al. | |
| D351,668 S | 10/1994 | Lim et al. | |
| 5,385,589 A | 1/1995 | Kratky | |
| 5,459,960 A | 10/1995 | Manlove | |
| 5,491,998 A | 2/1996 | Hansen | |
| 5,533,299 A | 7/1996 | Kratky | |
| D376,307 S | 12/1996 | Burgasser et al. | |
| 5,586,656 A * | 12/1996 | Abrums | B65D 21/0219 206/501 |
| D385,507 S | 10/1997 | Hulsebus | |
| 5,761,848 A | 6/1998 | Manlove | |
| D395,822 S | 7/1998 | Keal et al. | |
| 5,806,241 A * | 9/1998 | Byland | A01G 27/04 47/71 |
| 5,826,375 A | 10/1998 | Black | |
| 5,911,659 A | 6/1999 | Serano | |
| 5,930,951 A * | 8/1999 | Wong | A01G 9/02 47/66.1 |
| D414,413 S | 9/1999 | Brown | |
| 6,070,360 A * | 6/2000 | Liao | A01G 27/02 47/65.5 |
| 6,138,411 A * | 10/2000 | Lin | A01G 27/02 47/65.5 |
| 6,161,332 A | 12/2000 | Avot | |
| 6,233,870 B1 | 5/2001 | Horibata | |
| D446,157 S | 8/2001 | Glenn | |
| D448,862 S | 10/2001 | Kieffer | |
| 6,298,600 B1 * | 10/2001 | Feldman | A47G 7/047 47/67 |
| 6,336,292 B1 | 1/2002 | Boxsell | |
| D454,180 S | 3/2002 | Wessels | |
| D468,812 S | 1/2003 | Doyle et al. | |
| 6,526,693 B2 | 3/2003 | Cochran | |
| 6,574,917 B2 | 6/2003 | Boxsell | |
| D483,443 S | 12/2003 | Forsberg | |
| D489,209 S | 5/2004 | Goldberg | |
| 6,814,250 B1 * | 11/2004 | Madsen | A47G 19/065 206/501 |
| D507,204 S | 7/2005 | Chang | |
| 6,928,772 B2 | 8/2005 | Bai et al. | |
| 6,948,349 B2 | 9/2005 | Gorski et al. | |
| 6,964,128 B2 * | 11/2005 | Yasuda | A01G 9/02 47/20.1 |
| D512,877 S | 12/2005 | Vovan | |
| 7,000,351 B2 * | 2/2006 | Baumann | A01G 27/04 47/32.7 |
| 7,076,921 B2 | 7/2006 | Spradlin | |
| 7,171,781 B1 | 2/2007 | Southern | |
| 7,171,783 B1 * | 2/2007 | Fidotti | A01G 27/04 47/81 |
| D541,148 S | 4/2007 | Gross et al. | |
| 7,210,266 B2 | 5/2007 | Henry et al. | |
| 7,263,781 B2 | 9/2007 | Sielemann | |
| D552,218 S | 10/2007 | Alldredge | |
| 7,340,863 B1 | 3/2008 | Dressler | |
| 7,412,798 B2 | 8/2008 | Boxsell | |
| 7,506,472 B2 | 3/2009 | Leyns et al. | |
| 7,533,493 B2 | 5/2009 | Brusatore | |
| 7,587,930 B2 | 9/2009 | Leclerc et al. | |
| 7,610,717 B2 * | 11/2009 | Luken | A01G 9/021 24/457 |
| 7,624,535 B2 | 12/2009 | Schmidt | |
| D612,732 S | 3/2010 | Takata et al. | |
| 7,690,150 B2 | 4/2010 | Orschulik | |
| D614,994 S | 5/2010 | Dipaolo et al. | |
| 7,730,672 B2 | 6/2010 | Knudson et al. | |
| 7,832,144 B2 | 11/2010 | Corradi | |
| D628,443 S | 12/2010 | McTaggart | |
| 7,874,102 B2 | 1/2011 | Hilbert | |
| D631,683 S | 2/2011 | Ash et al. | |
| 7,972,840 B2 * | 7/2011 | Hasegawa | C12M 25/02 435/297.1 |
| D666,524 S | 9/2012 | Aoyama | |
| D673,054 S | 12/2012 | Kim et al. | |
| D674,889 S | 1/2013 | Mims | |
| D677,156 S | 3/2013 | Wu | |
| D684,857 S | 6/2013 | Zhen | |
| 8,474,179 B2 * | 7/2013 | Jung | A01G 9/086 47/65.6 |
| D688,891 S | 9/2013 | Caruso | |
| 8,549,788 B2 | 10/2013 | Bryan, III | |
| D694,586 S | 12/2013 | Miller et al. | |
| D697,801 S | 1/2014 | Rapparini | |

(56) References Cited

U.S. PATENT DOCUMENTS

| | | | |
|---|---|---|---|
| D708,506 S | 7/2014 | Wu | |
| D718,847 S | 12/2014 | Haley et al. | |
| D718,876 S | 12/2014 | Smedberg | |
| D719,084 S | 12/2014 | Kruse | |
| 8,984,807 B2 | 3/2015 | Hansen et al. | |
| D726,888 S | 4/2015 | Johansen | |
| 9,038,312 B2 | 5/2015 | Harbaugh | |
| D736,900 S | 8/2015 | Frelier | |
| 9,220,207 B2 | 12/2015 | Storey | |
| 9,266,517 B2 | 2/2016 | Knechtges et al. | |
| 9,341,266 B1 | 5/2016 | Vivatson | |
| 9,510,524 B2 | 12/2016 | Anderson et al. | |
| 9,534,391 B2 | 1/2017 | Haley et al. | |
| 9,534,842 B1 | 1/2017 | Rivera et al. | |
| D789,499 S | 6/2017 | Slorach | |
| 9,795,089 B2 | 10/2017 | Kantola et al. | |
| 2005/0086861 A1* | 4/2005 | Atchley | A01G 9/00 47/65.5 |
| 2005/0274073 A1 | 12/2005 | Brooke et al. | |
| 2006/0150497 A1 | 7/2006 | Kaprielian | |
| 2006/0288640 A1* | 12/2006 | Leithold | A01G 9/028 47/39 |
| 2008/0230010 A1 | 9/2008 | Buck | |
| 2008/0302010 A1 | 12/2008 | Cordon | |
| 2009/0056215 A1* | 3/2009 | Yang | A01G 9/028 47/66.1 |
| 2009/0151269 A1 | 6/2009 | Eiger et al. | |
| 2009/0166369 A1 | 7/2009 | Savicki | |
| 2009/0241417 A1 | 10/2009 | Smith | |
| 2009/0278641 A1 | 11/2009 | Hedayat | |
| 2010/0147848 A1 | 6/2010 | Rider, Jr. et al. | |
| 2010/0170154 A1 | 6/2010 | Ahn | |
| 2011/0114800 A1 | 5/2011 | Gramling | |
| 2011/0138698 A1 | 6/2011 | Neumann | |
| 2012/0180818 A1 | 7/2012 | Janesky | |
| 2012/0324787 A1 | 12/2012 | Daas et al. | |
| 2013/0056475 A1* | 3/2013 | Buck | A47G 19/2205 220/592.2 |
| 2013/0133252 A1 | 5/2013 | Harbaugh | |
| 2014/0041297 A1 | 2/2014 | Miel et al. | |
| 2014/0215919 A1 | 8/2014 | Harbaugh | |
| 2014/0223818 A1* | 8/2014 | Coghlan | A01G 31/02 47/62 R |
| 2015/0040474 A1 | 2/2015 | Lee et al. | |
| 2015/0068121 A1 | 3/2015 | Probst et al. | |
| 2015/0082692 A1 | 3/2015 | Wardenburg et al. | |
| 2015/0184393 A1 | 7/2015 | Conner | |
| 2015/0216131 A1 | 8/2015 | Van Wingerden | |
| 2015/0237807 A1 | 8/2015 | Valiquette | |
| 2015/0305261 A1 | 10/2015 | Wilson et al. | |
| 2015/0342127 A1 | 12/2015 | Gallant | |
| 2016/0136831 A1 | 3/2016 | Bonnet et al. | |
| 2016/0100535 A1 | 4/2016 | Daugirdas | |
| 2016/0183486 A1 | 6/2016 | Kabakov | |
| 2016/0192607 A1 | 7/2016 | Kitagawa | |
| 2016/0223418 A1 | 8/2016 | Wüest et al. | |
| 2017/0086399 A1 | 3/2017 | Anderson et al. | |
| 2017/0119971 A1 | 5/2017 | Marsh et al. | |
| 2017/0231167 A1 | 8/2017 | Storey | |
| 2017/0254088 A1 | 9/2017 | Axford | |

FOREIGN PATENT DOCUMENTS

| | | |
|---|---|---|
| EP | 001257786-0001 | 2/2011 |
| GB | 2077082 A | 12/1981 |
| JP | H03 127919 A | 5/1991 |
| WO | WO-2014/199917 A1 | 12/2014 |

OTHER PUBLICATIONS

Large and Small Mask Clicker Dies from ScrapWorksArmory on Etsy Studio, website 2017, https://www.etsystudio.com/listing/231288759/large-and-small-mask-clicker-dies, [visited Sep. 11, 2017].
Old-Fashioned Cast Iron Shelf Bracket—Signature Hardware, http://www.signaturehardware.com/old-fashioned-cast-iron-shelf-bracket.html#pr-header-back-to-top-link, [visited Sep. 11, 2017].
Steel Rule Dies & Clicker Dies, website 2006, http://swansondie.com/clicker.htm, [visited Sep. 11, 2017].
Autopot Irrigation Watering System Parts/Spare Accessories Connectors Hydro IWS | eBay, http://www.ebay.com/itm/Autopot-Irrigation-Watering-System-Parts-Accessories-Connectors -Hydroponic-/121502209218, [visited Sep. 15, 2017].
"International Search Report and Written Opinion Issued in PCT Application No. PCT/US2017/044031", dated Apr. 20, 2018, 14 Pages.

* cited by examiner

APPARATUS, SYSTEM AND METHOD FOR A GROW RING FOR PRODUCE

RELATED APPLICATIONS

This application claims the benefit of and is a continuation of U.S. Non-Provisional patent application Ser. No. 14/174,192, entitled "AN APPARATUS, SYSTEM AND METHOD FOR A GROW RING FOR PRODUCE" filed Feb. 6, 2014, which is incorporated herein by reference in its entirety.

BACKGROUND

The process of growing produce for ultimate consumer purchase involves many stages. These stages include produce growth, cultivation, harvesting, transportation, and commercial display, where each stage is independently important to the end result.

Currently, the standard process for growing hydroponic produce is to use a trough system or floating Styrofoam system. In some circumstances, if these devices are to hold a plug of growing medium, it is generally in a small plastic cup that has limited other applications. Once harvested, the produce is generally placed in a plastic shell container that completely encloses the product. The product is then shipped and displayed in this manner, which can be unattractive and obscure the quality of the product. In an alternative process, produce may be loosely shipped and displayed without a protective cover on a produce rack but requires constant mist hydration to keep the product wet. In either case, the stages of the process are disjointed and require an added expense of refrigeration during transportation and display.

Finally, in some instances such as herb growth, products may be harvested and shipped in a flimsy plastic sleeve with water in the base. However, because the sleeve is not rigid, water often spills during transportation or display which can lead to premature spoilage of the product.

Once a consumer purchases produce, the consumer must often refrigerate the produce in order to keep it from spoiling. This not only uses energy, but takes up limited refrigerator space.

SUMMARY

In one exemplary embodiment, a produce grow ring device may be provided. A produce grow ring device may include a cup and a grow ring seating portion. The cup may have a root aperture and the grow ring seating portion may be disposed from an upper edge of the cup. The grow ring seating portion may have at least one lip and at least one flange.

In another exemplary embodiment, a produce system may be provided. The system may include a grow ring device, a bowl, and a base. The grow ring device may have a cup and a grow ring seating portion. The cup may have a root aperture. The grow ring seating portion may have at least one grow ring lip and at least one flange. The bowl may have a bowl wall, a substantially flat bottom bowl surface, a bowl lip, a bowl top edge, and a bowl aperture in the substantially flat bottom bowl surface. The bowl lip may be disposed proximate an intersection between the bowl wall and the substantially flat bottom bowl surface. The base may have a substantially flat bottom and a base lip. The base lip may be disposed around a perimeter of a top edge of the base and may be designed for attaching the base to the bowl lip.

In yet another exemplary embodiment, a method for growing, transporting, displaying, and storing produce may be provided. A plug of growing medium with a seedling, a grow ring device, and a hydroponic trough may be provided. The trough may have the ability to support a grow ring so that a root aperture in the grow ring is proximate a flow of nutrients. The plug of growing medium and the seedling may be inserted in the grow ring. The roots may be allowed to grow through the root aperture and into the flow of nutrients in the trough. The plant may be allowed to reach a desired maturity. Once the desired maturity has been reached, the plant and grow ring may remain intact and may be placed in a bowl by securing the grow ring in a bowl aperture in the bottom of the bowl. A base may be secured to the bottom of the bowl. The base may contain the plant roots and the base may be filled with water or nutrients.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Referring to the figures generally, a grow ring 110 may include a cup portion 112 and a grow ring seating portion 120. Cup portion 112 may have a bottom edge 114 and a root aperture (not shown in FIG. 1) disposed in its bottom. Bottom edge 114 may be beveled or tapered. In some exemplary embodiments, the taper of bottom edge 114 may facilitate guiding grow ring 110 into a bowl aperture. In other exemplary embodiments, all of cup portion 112 may be tapered, having a wider diameter at top edge 118 than bottom edge 114. Indentations may be disposed around the sidewall of cup portion 112. The indentations may guide the roots of produce in a grow ring to grow down through the root aperture. Grow ring seating portion 120 may be disposed around an upper edge 118 of cup 112. Grow ring seating portion 120 may include a grow ring lip 134 and at least one flange 130. Grow ring lip 134 may include a horizontal portion 122, an edge 124, and a substantially vertical portion 126. In some exemplary embodiments, grow ring lip 134 has a greatest diameter at edge 124.

Figure 2:
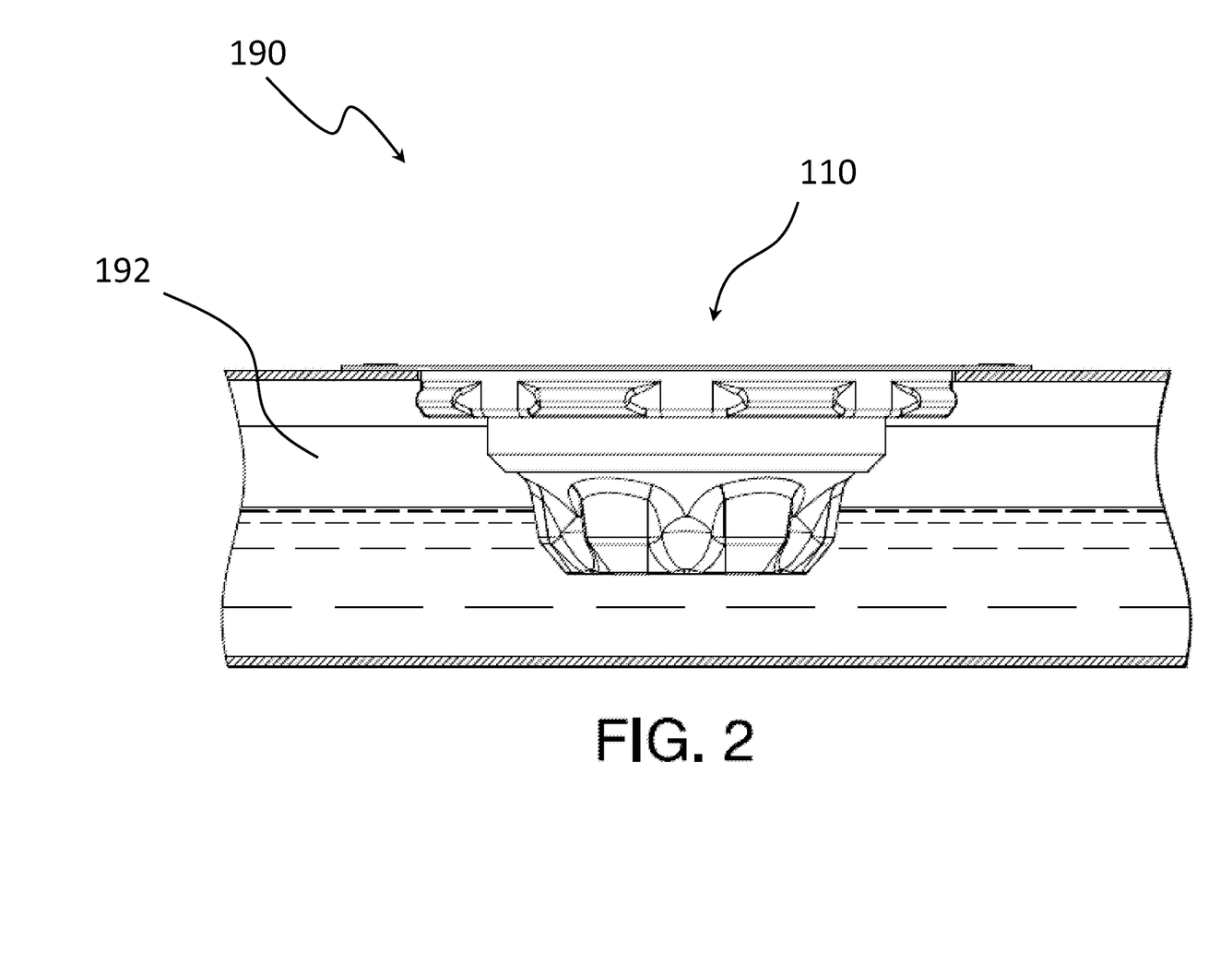
FIG. 2 is an elevation view of a grow ring in a trough.
Figure 3:
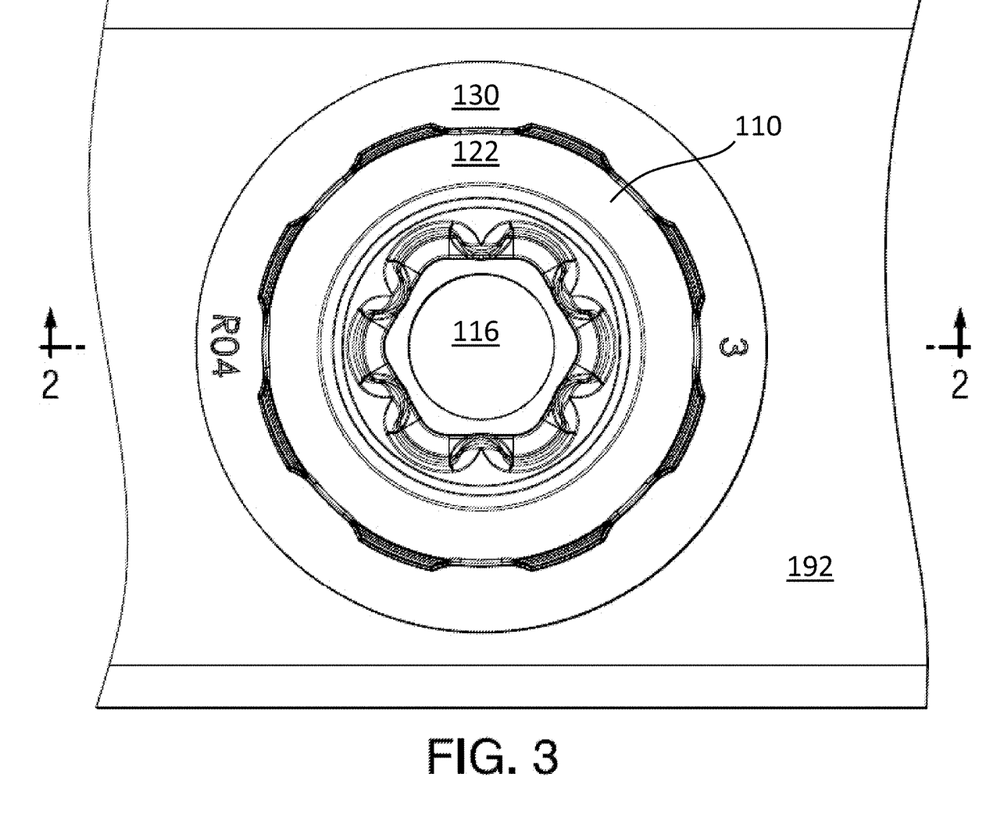
FIG. 3 is a top view of a grow ring in a trough.
Figure 4:
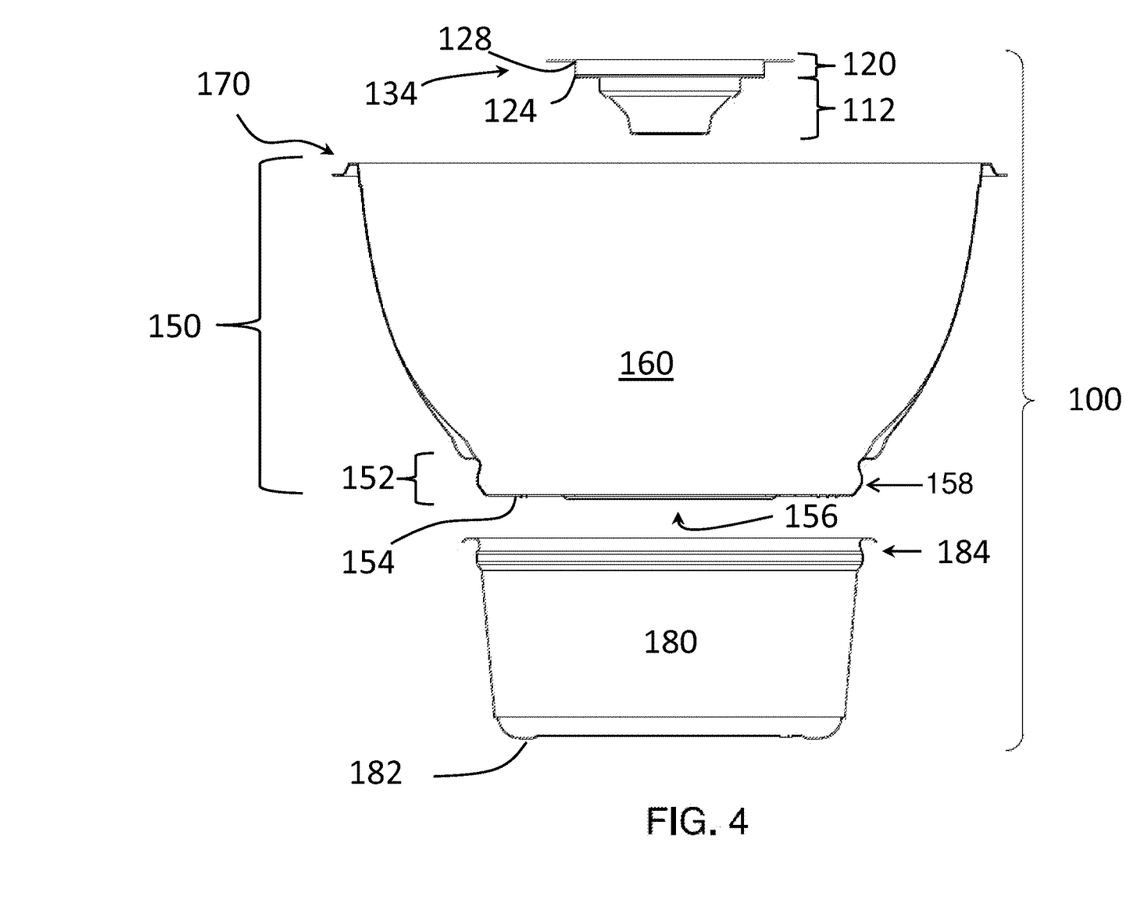
FIG. 4 is an exploded view of a produce display system.
Figure 6:
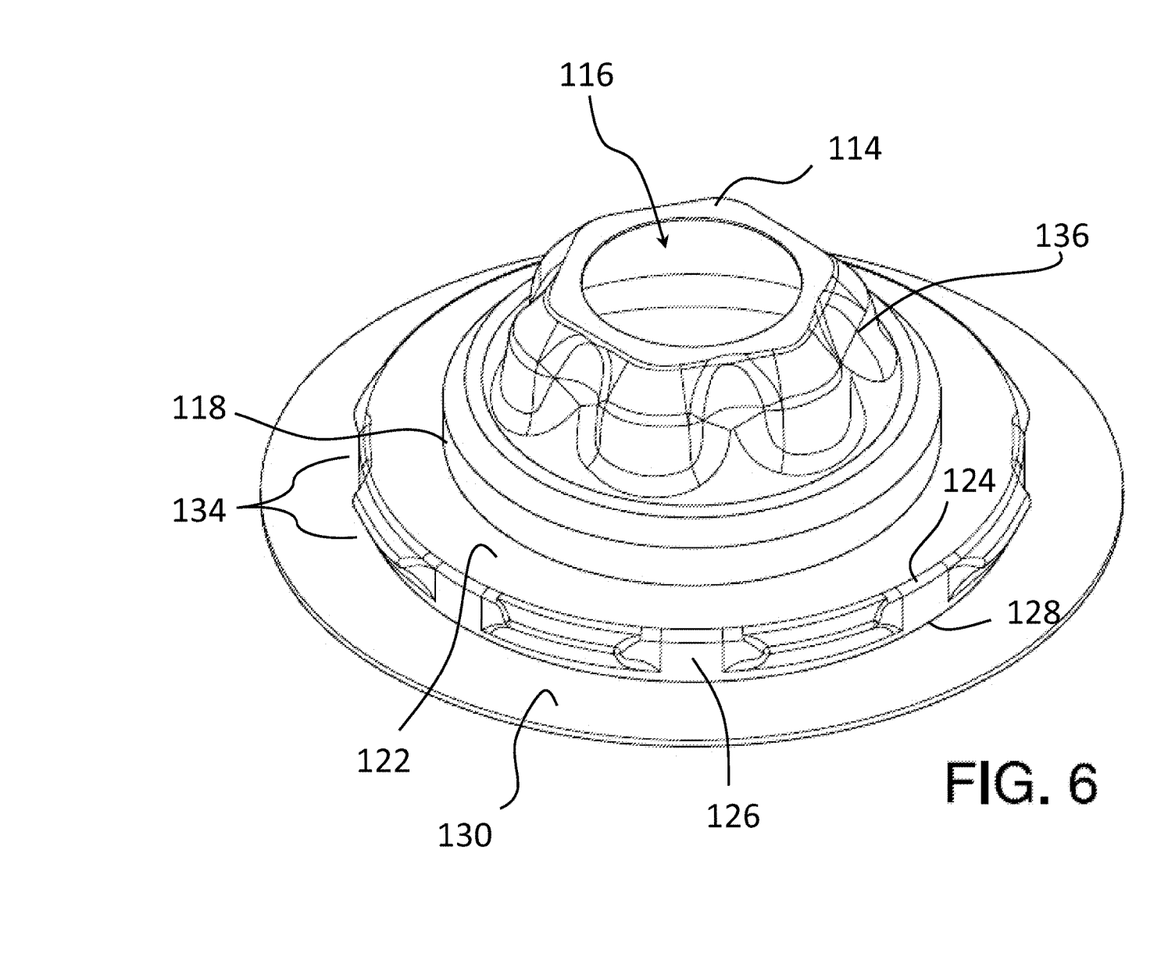
FIG. 6 is a bottom isometric view of a grow ring.
Figure 7:
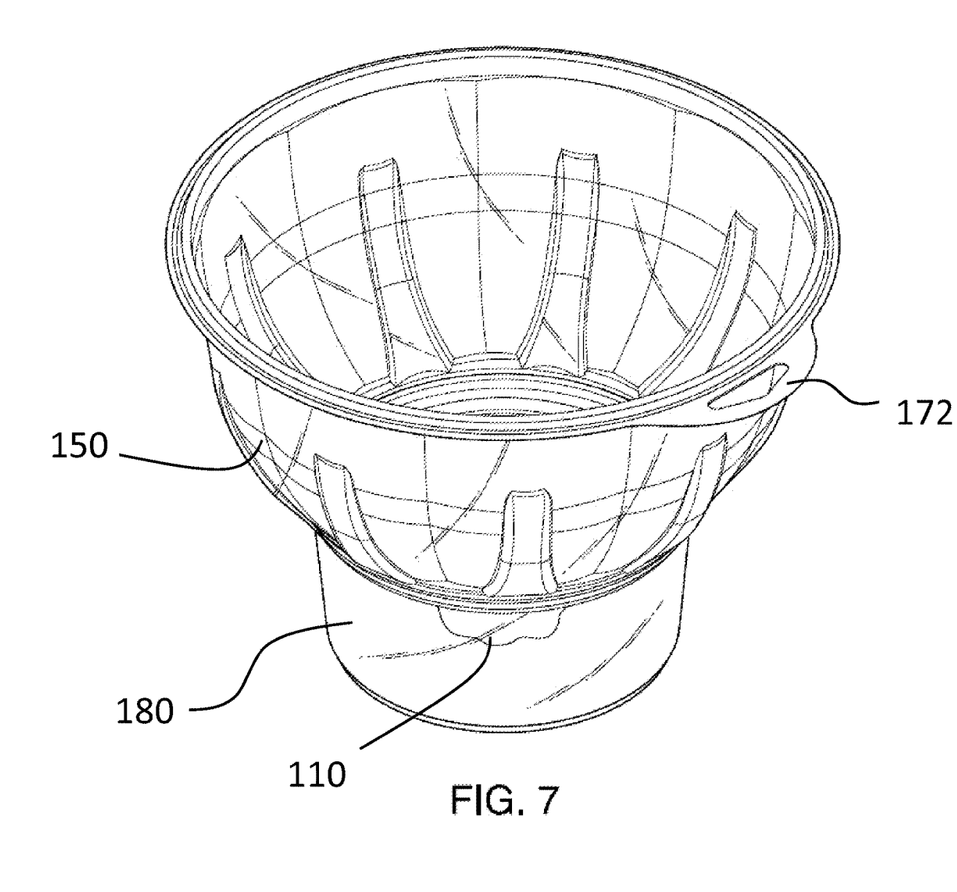
FIG. 7 is a top isometric view of a produce display system.

In one exemplary embodiment of grow ring lip 134, a horizontal portion 122 may be disposed outward from an upper edge 118 of cup portion 112. A substantially vertical portion 126 may extend above the outer edge 124 of horizontal portion 122 and a top flange 130 may be disposed outward from the top edge 128 of substantially vertical portion 126. Substantially vertical portion 126 therefore connects the outer perimeter of horizontal portion 122 and the inner perimeter of top flange 130. Substantially vertical portion 126 may be disposed at an angle in relation to horizontal portion 122 and top flange 130. Edge 128 may therefore have a different diameter than edge 124. In one exemplary embodiment, substantially vertical portion 126 and flange 130 may create a 10 degree undercut, as shown in FIG. 4. In other words, the angle between top flange 130 and substantially vertical portion 126 may be approximately 80 degrees. As a result, edge 128 may have a smaller diameter than edge 124. This may allow for securing grow ring 110 in a bowl aperture, such as one in a display bowl or hydroponic trough. The bowl aperture may have a diameter less than edge 124, therefore requiring force to pass edge 124 through the bowl aperture and consequently seat or unseat grow ring 110. In other exemplary embodiments, substantially vertical portion 126 may not be disposed at an angle, but may have protrusions disposed around its perimeter, as shown in FIGS. 2, 3, and 6. The diameter of substantially vertical portion 126 where it has a protrusion may be larger than the diameter of a bowl aperture. Therefore, when grow ring 110 is seated in a bowl aperture past the protrusions, it may be securely seated. In alternative embodiments, substantially vertical portion 126 may be formed to facilitate a variety of ways to couple grow ring 110 in a bowl aperture, such as friction fitting, screw fitting, flange in groove, adhesive, cake snap, or any other positive seal system reasonably understood by a person having ordinary skill in the art.

Grow ring 110 may have an overall diameter of approximately 1 inch to approximately 3 inches. Grow ring 110 may have an overall depth of approximately 0.5 inches to approximately 1.5 inches. Grow ring 110 may be sized differently for different types of plants or produce, as would reasonably be understood by a person having ordinary skill in the art. Grow ring 110 may be formed by injection molded plastic, vacuum molded plastic, or any other material reasonably understood by a person having ordinary skill in the art.

Figure 5:
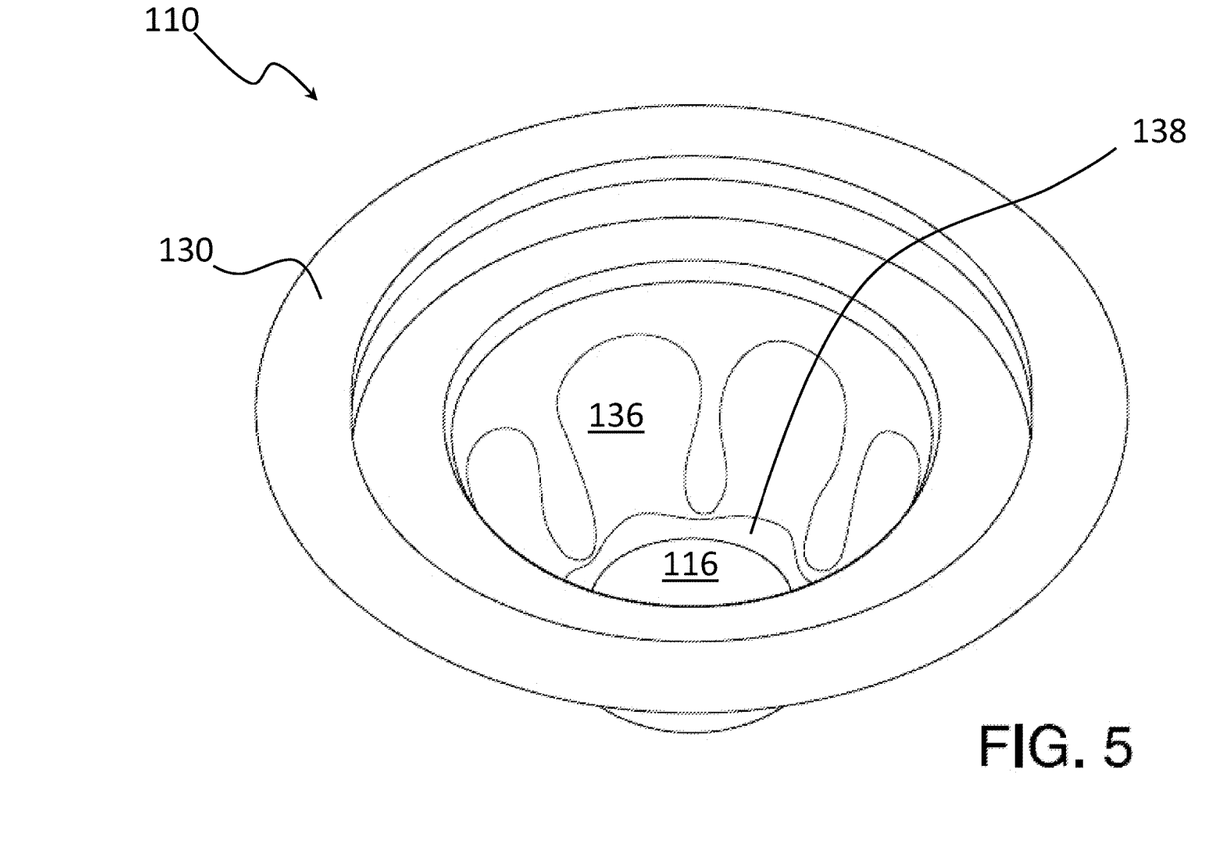
FIG. 5 is a top isometric view of a grow ring.

FIGS. 5 and 6 show isometric views of a grow ring 110. Grow ring 110 may have a root aperture 116 in its cup bottom surface 138. In one exemplary embodiment, root aperture 116 may have a diameter of approximately 0.5 inches to approximately 1 inch. However, root aperture may be sized differently to allow for various types of produce or plants. Root aperture 116 may allow roots of a plant pass to pass through grow ring 110.

FIG. 4 is an exploded view of a produce system 100. System 100 may be used for growth, transportation, display, and storage. System 100 may include a grow ring 110, a bowl 150, and a base 180. Some embodiments of grow ring 110 may be substantially similar to those described in reference to FIGS. 1 and 2. Grow ring 110 may have a cup portion 112 and a grow ring seating portion 120. Cup portion 112 may include a bottom edge 114, a top edge 118, a cup wall 136, a cup bottom surface 138, and a root aperture 116 in cup bottom surface 138. Grow ring seating portion 120 may include a grow ring lip 134 and a top flange 130. In an exemplary embodiment, grow ring lip 134 may include a horizontal portion 122, an edge 124, a substantially vertical portion 126, and an upper edge 128.

Bowl 150 may include a bowl coupling portion 152, a bowl wall 160, and a bowl top edge 170. Bowl coupling portion 152 may be shaped to couple with base 180. In some exemplary embodiments, bowl coupling portion 152 may have a bowl lip 158 that meets a substantially flat bottom bowl surface 154 of bowl 150. A bowl aperture 156 may be disposed in the substantially flat bottom bowl surface 154. Bowl aperture 156 may be sized to receive grow ring 110. Bowl 150 may have at least one hanger 172 disposed proximate the bowl top edge 170. Hanger 172 may be any type of hanger as would be reasonably understood by a person having ordinary skill in the art. Bowl 150 may also have a lid, which may be secured to bowl top edge 170.

Bowl aperture 156 and grow ring 110 may be any shape and dimensions that allow grow ring 110 to securely couple to bowl aperture 156, as would be reasonably understood by a person having ordinary skill in the art. Grow ring 110 may be inserted from inside bowl 150 so that cup portion 112 projects through bowl aperture 156 and top flange 130 remains within bowl 150. In some exemplary embodiments, grow ring 110 may be as described above regarding FIG. 1. Bowl aperture 156 in bowl 150 may be sized with a smaller diameter than edge 124 of grow ring 110, but a larger diameter than top edge 128 of grow ring 110. In an exemplary embodiment, bowl aperture 156 may have a diameter approximately equal to or greater than the outer diameter of top edge 128, but smaller than the diameter of edge 124. Grow ring 110 may be inserted through bowl aperture 156 from inside bowl 150. Cup 112 and grow ring lip 134 may be pushed through bowl aperture 156, until the grow ring top flange 130 comes in contact with substantially flat bottom bowl surface 154 of bowl 150, proximate bowl aperture 156. Alternative embodiments of grow ring 110 may include those described above regarding FIG. 1, including alternative embodiments of grow ring lip 134 and its coupling mechanism.

Substantially flat bottom bowl surface 154 and bowl aperture 156 may be shaped so that grow ring lip 134 and top flange 130 form a water-tight seal with bowl 150, preventing water from flowing around grow ring 110. The water-tight seal may prevent water from flowing into or out of base 180. For example, if produce system 100 were tilted, jostled, knocked over, rested on its side, or even upside down, water provided in base 180 for the plant to survive would not be able to escape base 180 through the connection between bowl 150 and grow ring 110. The roots and plant itself may also prevent or limit the ability of water to escape through root aperture 116. The roots may secure the produce in the grow ring by filling the root aperture 116. Additionally, the placement of root aperture 116 at the bottom of cup portion 112 provides water retention benefits. This may make it more difficult for water to reach and flow through the root aperture when the produce system is tilted, on its side, or upside down. The placement of the root aperture creates an additional surface the water must flow over when the system is tilted, on its side, or upside down. In other embodiments, substantially flat bottom bowl surface 154 and bowl aperture 156 may be shaped so that grow ring lip 134 and top flange 130 do not form a water-tight seal with bowl 150, allowing water to flow from bowl 150 around grow ring 110 and through bowl aperture 156. In yet other embodiments, substantially flat bottom bowl surface 154 and bowl aperture 156 may be shaped so that grow ring lip 134 and top flange 130 form a selective seal with bowl 150, providing a water-tight orientation and a non-water-tight orientation. For example, grow ring 110 may be rotated in bowl aperture 156 to alternate between a water-tight seal and a non-water-tight seal. Further still, some embodiments of grow ring 110 may allow water to flow one directionally, for example grow ring 110 may allow water to flow from bowl 150 into base 180, but not from base 180 to bowl 150.

Bowl 150 may be sized differently for different types of plants or produce. Bowl 150 may be plastic or any other material reasonably understood by a person having ordinary skill in the art.

Alternative embodiments of bowl 150 may have a section substantially similar to a grow ring formed integrally in the bottom of bowl 150. The substantially flat bottom bowl surface 154 may have a tapered cylinder or substantially conical section, disposed from it. This section may be disposed in the area where the bowl aperture 156 would be in the embodiments described above. The substantially conical section may be disposed below the bottom of bowl 150, similar to how a grow ring would sit if inserted in the above described embodiments of bowl 150. There may be root aperture at the bottom of the substantially conical section, which may allow the roots to pass through. The conical section may create a water dam effect, similar to embodiments having a grow ring inserted through the bottom of the bowl 150. A plant may be disposed directly in bowl 150 in this embodiment, or a plant may still be secured in a grow ring, which may then snap into the substantially conical section of bowl 150. The substantially conical section and the grow ring may be shaped to create a secure fit in such an embodiment. In embodiments where a plant is disposed directly in bowl 150, the plant may be grown from a seed in bowl 150 in substantially the same manner as it would be grown in a grow ring. Therefore, bowl 150 may be able to be situated on a hydroponic trough.

Base 180 may be substantially cylindrical and have an open top. Base 180 may have a substantially flat bottom 182 and a base lip 184, disposed around the open top, for securing to bowl lip 158. In other exemplary embodiments, base 180 may be substantially bowl shaped or any other shape understood to function as described by a person having ordinary skill in the art. In some exemplary embodiments, base lip 184 and bowl lip 158 may removably attach bowl 150 and base 180. In other exemplary embodiments, bowl 150 and base 180 may be permanently coupled. The connection may be substantially water tight. Lips 158 and 184 may couple in a variety of ways, including friction fit, screw fit, flange in groove, adhesive, and any other embodiment as would reasonably be understood by a person having ordinary skill in the art. Base 180 may be filled with water or nutrients. The roots disposed through root aperture 116 in grow ring 110 may be enclosed by base 180, allowing them to interact with the contents of base 180. Base 180 may stabilize system 100 when resting on a surface. Base 180 may allow system 100 to stand with the opening of bowl 150 substantially upward.

Base 180 may be sized differently for different types of plants or produce. Base 180 may be plastic or any other material reasonably understood by a person having ordinary skill in the art.

An alternative embodiment of base 180 may be formed with a top portion having a substantially conical section disposed toward the interior of base 180 therefrom. The top portion may be situated so that it is flush against the substantially flat bottom surface 154 of bowl 150. The conical section may be disposed so as to align with bowl aperture 156, allowing a plant to be positioned within bowl 150 and have its roots pass through a root aperture in the bottom of the substantially conical section. The top portion and substantially conical section may act as a water dam, similar to the grow ring 110 in combination with the bowl 150 and base 180. Base 180 may still secure to the bottom of bowl 150 in substantially the same manner. In some embodiments, a grow ring 110 may still be used to secure a plant in bowl 150 and pass its roots through an aperture in the substantially conical section of base 180. However, a plant may also be disposed in this alternative embodiment without the need for a grow ring.

Figure 1:
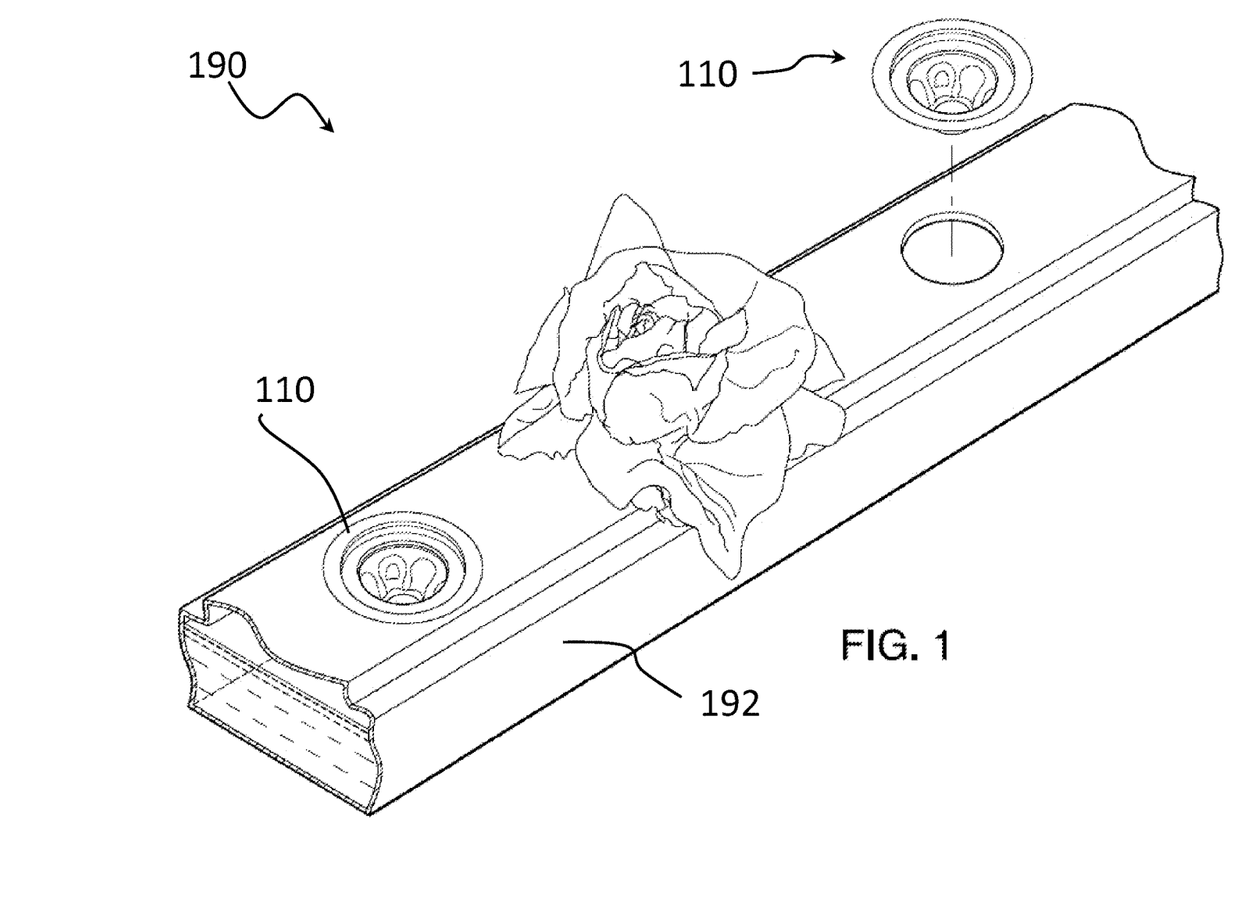
FIG. 1 is an isometric view of a hydroponic trough and grow ring system.

FIGS. 1-3 show a hydroponic trough and grow ring system 190. In some exemplary embodiments, grow ring 110 may rest loosely in a receiving aperture in a hydroponic trough 192. In other exemplary embodiments, grow ring 110 may snap into a receiving aperture in a hydroponic trough 192. Hydroponic trough 192 may provide a flow of water or nutrients. Grow ring 110 may be situated such that a root aperture in its cup portion is proximate the flow of water or nutrients.

An exemplary method of using a produce system 100 may proceed as follows. A plug of growth medium and a seedling may be placed in the cup of a grow ring. The grow ring may be secured proximate a flow of water or nutrients, such as those provided in a hydroponic growth apparatus. In one exemplary embodiment, this may include placing the grow ring in a receiving aperture in a top member of a trough. The seedling may then grow and its roots may pass through a root aperture in the bottom of the grow ring, allowing them to interact with the flow of water and or nutrients. The seedling may be allowed to grow to a desired maturity.

Once the desired maturity of the plant has been reached, the plant and grow ring may be removed from the growth apparatus. The grow ring may remain around the plant roots. The plant and grow ring may then be inserted in a bowl, which has a bowl aperture. The grow ring may be inserted through the bowl aperture until it snaps or secures in place. A base may then be secured to the bowl, enclosing the grow ring and roots exposed below the bowl. The connection between the base and the bowl may be substantially water tight, so that the base may hold water. With the roots soaking in water provided in the base, the plant may continue to live. The grow ring may act as a stopper and prevent water from flowing out of the base and through the bowl. In some embodiments, the coupling of the bowl and the grow ring may allow water to flow from the bowl, past the grow ring, and into the base. The plant or produce may continue to grow in the produce system, it may be transported in the system, it may be displayed in the system, or it may be stored in the system.

Since water may be provided to the produce from the base, the produce may continue to live during transportation, display for sale, and storage by a consumer. This may eliminate the need for watering and refrigeration to keep the produce fresh and consequently may eliminate the associated costs and reduce spoilage. In embodiments where the grow ring may act as a stopper, it may facilitate the transportation, storage, display and sale of the produce by retaining water despite movement of the system, including sloshing, tilting, tipping, falling, and dropping. This may further reduce incidental spoilage. The grow ring functioning as a water dam may also facilitate hanging of the system by a hanger disposed from the bowl portion. Some embodiments of the hanger suspend the system at an angle, which could allow the water to leak out of the base if the grow ring were not to act as a stopper.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A produce holder comprising:
   a bowl having:
     a bowl wall,
     a bottom bowl surface including a substantially flat bottom bowl surface and a substantially conical section fixedly extending from and disposed below the substantially flat bottom bowl surface,
     a bowl coupling portion including a bowl lip and an upper portion located above the bowl lip, the bowl lip disposed proximate to an intersection between the bowl wall and the substantially flat bottom bowl surface, protruding outward from the upper portion of the bowl coupling portion at the intersection, and extending along the entire circumference of the bowl at a consistent height, the upper portion being recessed as compared to the outwardly protruding bowl lip, and
     a bowl aperture disposed at an end of the substantially conical section of the bottom bowl surface for receiving a cup with a root aperture; and
   a base having a substantially flat bottom and a base lip disposed around a perimeter of a top edge of the base, the base lip formed for removably coupling the base to the bowl lip of the bowl such that at least a portion of an interior of the base lip securely fits around at least a portion of an exterior of the bowl lip,
   wherein the bottom bowl surface fixedly including the substantially conical section limits water from flowing out of the base and into the bowl via the bowl aperture when the base lip of the base is coupled to the bowl lip of the bowl, and
   wherein the base lip of the base and the bowl lip of the bowl, when coupled, form a substantially water-tight seal that limits water from flowing into or out of the base through the base lip.

2. The produce holder of claim 1, wherein the base is configured to hold water.

3. The produce holder of claim 1, wherein the substantially conical section of the bottom bowl surface extends into the base when the base lip of the base is coupled to the bowl lip of the bowl.

4. The produce holder of claim 1, wherein a size of the bowl aperture substantially corresponds to a size of the cup.

5. The produce holder of claim 1, wherein the base is configured to enclose one or more roots of a plant disposed through the root aperture of the cup within an interior of the base.

6. The produce holder of claim 1, wherein the base lip and the bowl lip removably couple the bowl and the base.

7. The produce holder of claim 1, wherein the bowl comprises at least one hanger disposed proximate to and extending outward from a bowl top edge.

8. The produce holder of claim 1, wherein the bowl includes one or more ridges disposed around the bowl wall.

9. The produce holder of claim 1, wherein the base includes an open top.

10. The produce holder of claim 9, wherein the base lip is disposed around the open top.

11. The produce holder of claim 1, wherein the base is substantially cylindrical or bowl shaped.

* * * * *